United States Patent
Letourneur (10) Patent No.: US 10,007,843 B1
(45) Date of Patent: Jun. 26, 2018

(54) PERSONALIZED SEGMENTATION OF MEDIA CONTENT

(71) Applicant: Amazon Technologies, Inc., Seattle, WA (US)

(72) Inventor: Herve Jacques Clement Letourneur, San Francisco, CA (US)

(73) Assignee: Amazon Technologies, Inc., Seattle, WA (US)

(*) Notice: Subject to any disclaimer, the term of this patent is extended or adjusted under 35 U.S.C. 154(b) by 29 days.

(21) Appl. No.: 15/191,268

(22) Filed: Jun. 23, 2016

(51) Int. Cl.
*G10L 15/04* (2013.01)
*G06K 9/00* (2006.01)
*G06F 17/21* (2006.01)

(52) U.S. Cl.
CPC ......... *G06K 9/00469* (2013.01); *G06F 17/21* (2013.01)

(58) Field of Classification Search
None
See application file for complete search history.

(56) References Cited

U.S. PATENT DOCUMENTS

| | | | |
|---|---|---|---|
| 8,260,915 B1* | 9/2012 | Ashear | G06F 13/00 709/224 |
| 8,874,731 B1* | 10/2014 | Puppin | G06F 17/30867 707/736 |
| 9,326,116 B2* | 4/2016 | Kandekar | G06Q 30/0214 |
| 9,372,849 B2* | 6/2016 | Gluck | G06F 17/218 |
| 9,535,886 B2* | 1/2017 | Gluck | G06F 17/218 |
| 9,740,930 B2* | 8/2017 | Mohanakrishnan | G06K 9/00469 |
| 9,886,422 B2* | 2/2018 | Gluck | G06F 17/218 |
| 2013/0100139 A1* | 4/2013 | Schliesser | G09B 5/02 345/467 |
| 2013/0283145 A1* | 10/2013 | Argent | G06F 17/241 715/231 |
| 2017/0060365 A1* | 3/2017 | VanBlon | G06F 3/0483 |
| 2017/0322914 A1* | 11/2017 | Gluck | G06T 11/001 |

* cited by examiner

*Primary Examiner* — Satwant Singh
(74) *Attorney, Agent, or Firm* — Lee & Hayes, PLLC (57) ABSTRACT

Personalized segmentation of media content may be performed to enable users to create end points to segment a media item based on user preferences, such as create a segment of a document that takes a predetermined amount of time to consume or read. In some embodiments, techniques may create new chapters or segments within existing chapters. The techniques may also create titles for the segments or chapters, possibly by leveraging text within the segment or chapter. The end points, segments/chapters, titles, and/or other information may be stored as annotations, which can be selectively used when rendering the media item to reveal the segments/chapters and other data.

20 Claims, 7 Drawing Sheets

PERSONALIZED SEGMENTATION OF MEDIA CONTENT

BACKGROUND

Content is increasingly being distributed in electronic form to an array of users for use on computing devices, such as electronic book (eBook) reader devices. Often, the content, such as a book, is replicated in a digital form to be similar to a physical form of the content. For example, when a publisher creates an electronic version and physical version of a book, both versions may include substantially the same words, same chapters, and same images. However, some publishers may make some variations between the versions due to advantages/disadvantages of the different forms of media. For example, an electronic version may include a video or animation whereas the counterpart physical version cannot support a similar video or animation.

Currently, many eBook reader devices enable users to annotate books, such as by adding notes, marking text (e.g., highlight, underline, etc.), and/or making other selections or marks which simulate modifications made in physical books, such as physical notes written in a physical book. These annotations are often stored separate from an eBook document file to preserve the eBook document file and to enable sharing of at least some of the annotations.

Some users desire to control when and how they access content or how and when other people access content on certain devices. For example, some devices allow a user to initiate a timer that limits use of the device to a predetermined amount of time. However, in the context of reading, such a feature may cause a user to end a reading session mid-paragraph or mid-sentence, which may result in a poor user experience.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure is directed to personalized segmentation of media content that enables users to create end points or otherwise segment a media item based on user preferences. For example, a user may desire to read for 20-25 minutes during a reading session one night, each night, or at another time. The user may also prefer to read a complete section or group of text during the reading session, such as complete chapters or other grouping of text. The disclosure pertains to determining logical breaks in the media item, such as an electronic book (eBook), to define a segment. The resulting segment, when selected using the disclosed techniques, will fulfill the user's desire to be presented with content that takes a range of time to read or otherwise consume (e.g., 20-25 minutes or another range of time), while having the user complete the session at a logical break in the media item. In some embodiments, techniques may create new chapters or segments within existing chapters. The techniques may also create titles for the new chapters or existing chapters, possibly by leveraging text within the new chapter or segment.

In various embodiments, a user may select or specify a desired amount of time to consume the media item. The selection may be an input of time; however, other inputs may be selected such as a number of words, number of pages, reference to another media item with desired segmentation, and so forth. When the selection is an amount of time, the process may determine a reading rate or consumption rate associated with the user, which may or may not be associated with the media item. For example, a reading rate may be the user's normal reading rate, a reading rate for the consumed portion of the media item, or another reading rate. The reading rate may be used to convert a desired reading time into a desired number of words for a reading session or a similar metric. The desired number of words may be used to determine a range of words to be searched to locate candidate end points. For example, if a reader desired to read for 20-25 minutes and has a reading rate of 100 words per minutes, then the range or words for the reading session is 2000-2500 words (20×100 and 25×100, respectively).

The techniques may then analyze at least the section of the 500 words within the range (i.e., 2500-2000=500 words) to determine candidate end points to segment the media item. The candidate end points may be determined in various ways, such as by analyzing grammar (e.g., sentence/paragraph structure, etc.), analyzing a document tree used to format the text (e.g., underlying hypertext markup language (HTML), etc.), from crowdsourced data that specifies one or more of the candidate end points, and/or using other techniques discussed herein. The techniques may select one or more end points from the candidate end points. The end points may be used to create a chapter or segment of text to be completed during the reading session. The end points, may be stored as annotations that are separate from the media file, but that may be used when rendering or outputting the media file. As annotations, the end points may be shared for use with other devices associated with the user and/or shared for use with other devices associated with other people.

In some embodiments, the end points may be used as markers to motivate a reader to complete a session or to gain a reward, such as see an interesting graphic at the end of the segment or chapter. For example, a parent may desire to create shorter chapters in a book to help motivate a child to complete discrete segments (e.g., the new chapter segments). The techniques may insert, possibly via annotations, an interesting graphic at the end of the segments (e.g., goal post, fireworks animation, etc.) to motivate readers to finish the segments. In some embodiments, the interesting graphic may be received by way of user input, such as to enable creation of customized graphics or rewards. The end points may also be shared with other users. For example, a book club may desire to insert end points at various points in an electronic book to help keep readers in the book club on a same reading schedule. The end points may not align with pre-established chapters or breaks in the book. Thus, the techniques may create end points as discussed above, which may be shared with other users, such as members of a book club, a class of students, friends, or other people having compatible devices.

The techniques and systems described herein may be implemented in a number of ways. Example implementations are provided below with reference to the following figures.

Figure 1:
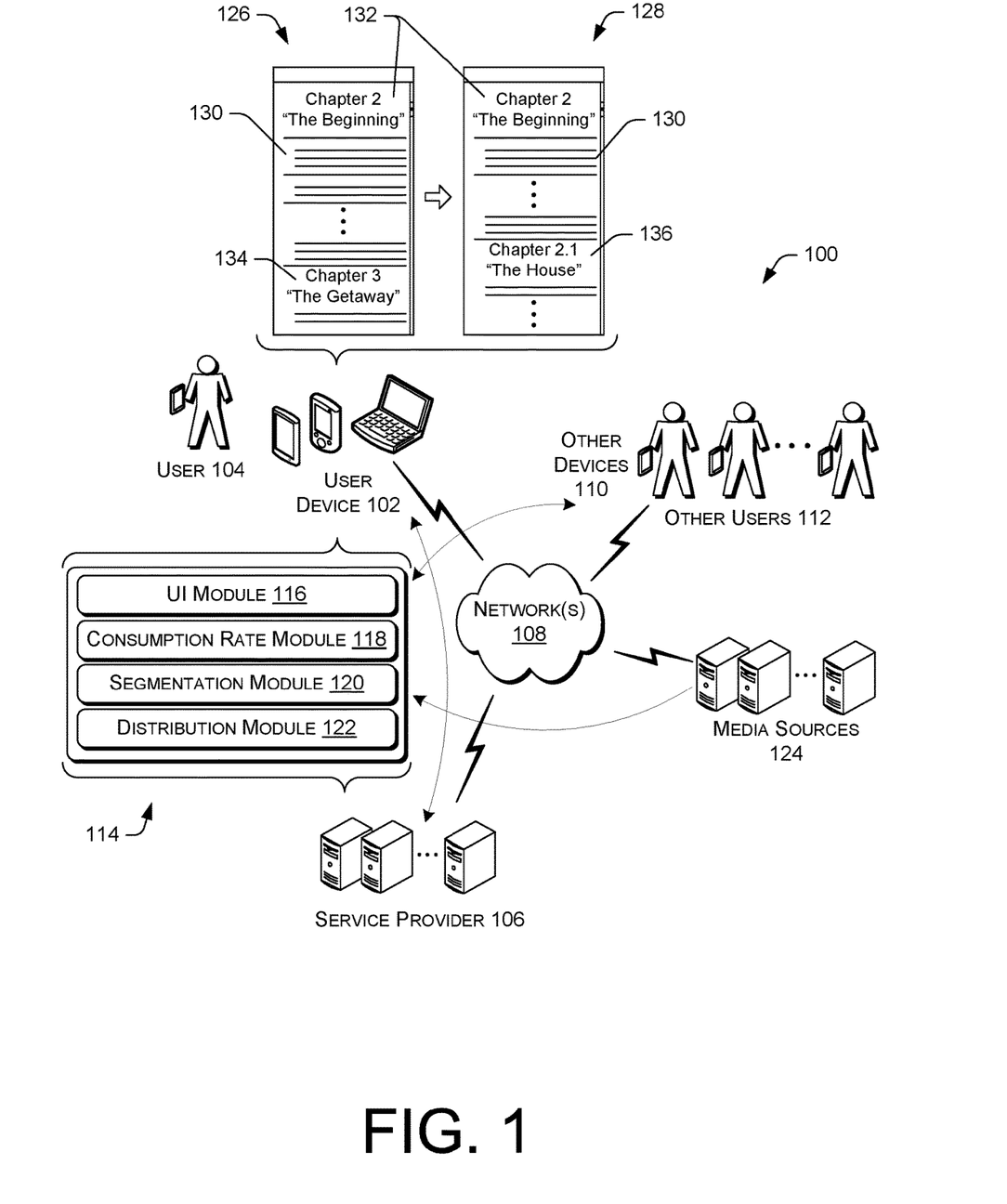
FIG. 1 is a schematic diagram of an illustrative computing environment to perform personalized segmentation of media content.

FIG. 1 is a schematic diagram of an illustrative environment 100 usable to perform personalized segmentation of media content. The environment 100 may include a user device 102 that outputs formatted media content, such as eBooks, webpages, documents, blogs, and/or other text-based content. The user device 102 may be configured to output audio, such as music, podcasts, audiobooks and/or other audio content and/or video content, such as television episodes, movies, and/or other videos. In some embodiments, the user device 102 may be a special purpose devices, such as an eBook reader device that includes an electronic ink display optimized for prolonged reading of text and reduced power usage to optimize use of a battery that powers the user device 102. The user device 102 may be associated with a user 104, and possibly with other users.

The user device 102 may be in communication with a service provider 106 via one or more networks 108, such as wired and/or wireless networks. The service provider 106 may be an entity associated with computing devices that support remote computing for a benefit of the user 104 and the user device 102. The service provider 106 may be implemented as a server, a collection of computing devices, a cloud computing service, or using other computing configurations to enable an exchange of data with the user device 102 and/or other devices 110 associated with other users 112. The service provider 106 may provide media content to the user device 102, such a providing downloadable eBooks, documents, audio files, videos, websites, and/or other media content. For example, the service provider 106 may host an electronic marketplace where users can purchase or otherwise access content to be downloaded to the user device 102 for consumption by the user 104. The content may be a text-based item that is formatted to include pre-established divisions, such as chapters or segments, often selected by an author, creator, producer, or publisher of the text-based item.

As discussed above, the user 104 may desire to create a personalized segment having a desired length that, when consumed by the user, limits consumption to a desired amount of time. Although the discussion that follows is focused on consumption of text-based content, the techniques may also be applied to audio and/or video media, as explained in this disclosure. Thus, the user 104 may desire to create personalized chapters or segments, which may be created based on metrics received via user input from the user 104. Various modules 114 may be used by the user device 102, the service provider 106, or both to create the personalized chapters or segments described herein. In some embodiments, the modules 114 may be executed by the user device 102 to enable the user device 102 to perform these tasks possibly without network connectivity to the service provider 106 and/or possibly without reliance on data provided by other devices. In various embodiments, the modules 114 may be executed by the service provider 106. Here, the user device 102 may send a request to the service provider 106 to request the service provider 106 to execute one or more of the modules 114 and return data back to the user device 102, such as annotations that indicate location and attributes of personalized chapters or segments of a text-based document such as an eBook. In accordance with one or more embodiments, the modules 114 may be executed, at least partly, by both the user device 102 and the service provider 106 to share workload or for other reasons. The modules 114 may include a user interface (UI) module 116, a consumption rate module 118, a segmentation module 120, and a distribution module 122, each described in turn.

The UI module 116 may receive user inputs, either directly from the user 104 of from an intermediary device, such as from the user device 102, or directly from the user 104. A user input may include a selection of a desired reading time or consumption time of the media content, such as a book. For example, the user may specify that she desires to read for about 20 minutes via input received by the UI module 116. The desired reading time may be input as one or more values. For example, the input may be a minimum time, a maximum time, a target time, or a range of time. When the input includes a single time, the time may be used to generate a range of time, such as by determining outer bounds of the range using a percentage, a fixed amount of time, a lookup table, or using other techniques. The UI module 116 may also capture other information, such as suggested end points for segmenting a media file, a selection of graphics or other content for use at or near selected endpoints (e.g., a fireworks animation, a goalpost image, a reward notification created by a user, etc.). Additional functionality and use of the UI module 116 are described below. In some embodiments, the UI module 116 may capture a reference media item to use for a basis of segmenting a different media item. For example, a user may specify a book where she liked the chapter length. This information may be used to segment a particular book to include chapters of a similar length (e.g., in words or in reading time, possibly using different reading rates for the different sources).

The consumption rate module 118 may determine a consumption rate associated with a user, such as the user 114. The consumption rate may be a reading rate or speed of the user in time per number of words or another metric. The reading speed may be a general reading speed (e.g., average speed), a reading speed associated with a specific media item, a recent reading speed (e.g., a weighted average), a reading speed associated with a category, author, or type of content, and so forth. The consumption rate may be updated regularly to maintain an updated and current value or set of values. In some embodiments, the consumption rate module 118 may determine an average consumption rate for multiple users, such as for a book club, a class of students, and/or other designated groups of people.

The segmentation module 120 may determine a portion of the media item to search within for end points to segment or chapterize the media item. For example, the segmentation module 120 may convert the desired reading time into a desired range of words based on the consumption rate. The segmentation module 120 may use various techniques described herein to determine candidate end points within the desired range of words. The end points may be logical breaks in text, which may be identified by a format of the media item, grammar, content analysis (e.g., analyzing the storyline for groupings of themes, etc.), information provided by the other users 112 via the other devices 110, information from media sources 124, and/or other information. The segmentation module 120 may then select one or more end points from the candidate end points for use in segmenting the media item. In some embodiment, the segmentation module 120 may determine titles or other attributes for association with the segments and/or the end points. For example, the segmentation module 120 may associate an image, graphic, or reward with an end point of a segment. The segmentation module 120 may store the segments, end points, and/or attributes as annotations. The annotations may be stored separate from the media item, but may be used to modify rendering or output of the media item. For example, the annotations may be used to create a menu for the media item (e.g., a list of segments for selection, possibly with existing segments/chapters, etc.), and/or to update display of text by adding demarcations that show a start and end of a segment (e.g., a segment title, white space, a blank page, and so forth).

The distribution module 122 may enable sharing or other distribution of the segments, end points, attributes, and/or other data, possibly by way of sharing the annotations. The distribution module 122 may send the annotations to the user device 102 to modify a media item for output to the user 104. The distribution module 122 may exchange the annotations or other data created by the modules 114 or used by the modules 114 with the other devices 110 associated with the other users 112 and/or with the media sources 124. For example, a teacher may desire to segment a book in a particular way to keep his class on a reading schedule for daily discussions about the book. The teacher may use the modules 114 to segment his book, and then the distribution module 122 may be used to distribute the segmentation information, possibly by way of annotations, to devices used by the students of the class. For example, the annotations may be pushed to specific user devices of users (e.g., by designating user identifiers, addresses, or other information), or by pull requests from other user devices, such as by downloading annotations stored by the service provider 106 and/or the user device 102 (e.g., via a peer-to-peer configuration).

Example UIs 126 and 128 show segmentation before (e.g., in a first UI 126) and after (e.g., in a second UI 128) personalized segmentation is performed on a media item, such as an eBook. The UIs may include content 130, which may be text or other media which is common between the first UI 126 and the second 128. In addition, some existing segmentations 132 (e.g., chapters, section breaks, etc.) may be common between the first UI 126 and the second UI 128. In some embodiments, the first UI 126 may show content without annotations that include personalized segmentation generated as described above and elsewhere in this disclosure. Thus, the first UI 126 may be rendered with a subsequent existing chapter 134 (e.g., "Chapter 3") that directly follows an earlier chapter included in the existing segmentations 132 (e.g., "Chapter 2"). Meanwhile, the second UI 128 may show the content rendered using information from the annotations that include segmentation (e.g., an end point, a title, etc.). The annotations may include a segment 136 (e.g., "Chapter 2.1"), which may be rendered after the existing segmentations 132 (e.g., "Chapter 2") and before the subsequent existing chapter (e.g., "Chapter 3"). The segment 136 may be generated by use of the modules 114 to enable the user 104 to locate a natural or logical end point to end a consumption or reading session when interacting with the user device 102. For example, the user 104 may desire to read for about 20 minutes. The segment 136 may be placed about 20 minutes into the content 130 from the "Chapter 2" heading, based on the reading speed of the user 104.

Figure 2:
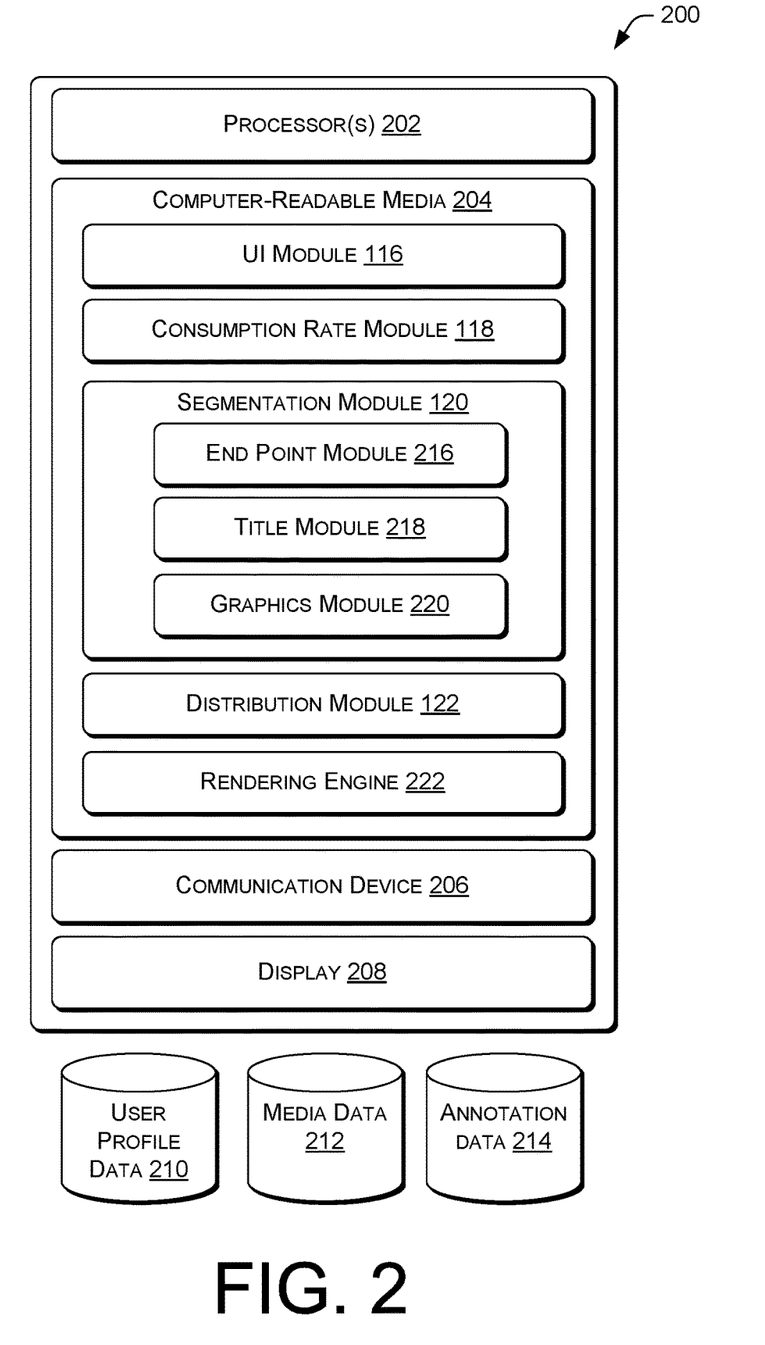
FIG. 2 is a block diagram of an illustrative computing architecture to perform personalized segmentation of media content.

FIG. 2 is a block diagram of an illustrative computing architecture 200 to perform personalized segmentation of media content. The computing architecture 200 may be implemented in a distributed or non-distributed computing environment. The computing architecture 200 may be used by the user device 102, the service provider 106, both, or in a shared/distributed configuration.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the user device 102, the service provider 106, or both.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

The computing architecture 200 may include a communication device 206, such as a network device and/or transceiver to communicate and/or exchange information with other devices. In some embodiments, the computing architecture 200 may include a display 208 to enable rending content for output to a user. The display 208 may be an electronic ink display commonly used for electronic book reader devices. The computing architecture 200 may include data sources including user profile data 210, media data 212, and annotation data 214. The user profile data 210 may be used to store user-specific information, such as user preferences, user consumption rate(s), and/or other user information. The media data 212 may store the media items, such as eBooks and/or other media items such as audio and/or video. The annotation data 214 may store the annotations, which may include the segments, end points, titles, and/or other information used to create personalized segmentation of a specific media item stored in the media data 212.

In some embodiments, the computer-readable media 204 may store the UI module 116, the consumption rate module 118, the segmentation module 120, and the distribution module 122, as described above. In addition, the computer-readable media 204 may store an end point module 216, a title module 218, and a graphics module 220. The computer-readable media 204 may also store a rendering engine 222 to render the media items, possibly with the segmentations included in the annotations data 214. The modules, engines, and/or components may be stored together or in a distributed arrangement.

The end point module 216, may use various techniques described herein to determine candidate end points within the desired range of words. The end points may be logical breaks in text. In some embodiments, the end point module 216 may refrain from creating or selecting candidate end points that separate related content, such as images that are related to text, such that the images become associated with a different segment (or chapter) than the associated text. The end point module 216 may create candidate end points by analyzing a format of the media item. The format may be provided by a document tree, such as from HTML expressions. As an example, an end of a table structure in HTML may be identified as a candidate end point. The end point module 216 may create candidate end points by analyzing grammar, such as paragraph usage, sentence usage, and other grammar usage. For example, the end point module 216 may create a candidate end point at the end of a sentence, paragraph, or page, rather than mid-sentence or possibly mid-paragraph. The end point module 216 may create candidate end points by analysis of the underlying media content. For example, the end point module 216 may analyze text of a storyline for groupings of themes and create candidate end points at the end of such groupings. As another example, the end point module 216 may determine when characters enter or exit a scene, or when a scene changes, which may be determined as candidate end points. The end point module 216 may create candidate end points by analyzing information provided by the other users 112 via the other devices 110. The information may be crowd-sourced end point information, end points established by other user devices, edits to end points, commentary on end points, and other user-generated information related to end points. As an example, a location that one of the other users 112 terminates a reading session may be estimated based on consumption speed and time on a page. The estimated location of the termination point may be used as a candidate end point by the end point module 216. The end point module 216 may create candidate end points by analyzing information from the media sources 124. For example, an eBook may include an audiobook version. The end point module 216 may analyze the audiobook for long pauses by a presenter, which may be associated with text in the eBook and used as candidate end points, or vice versa. The end point module 216 may select one or more end points from the candidate end points for use in segmenting the media item.

The title module 218 may determine a title or other attributes for association with a segment. The title module 218 may create generic titles for segments, such as numbers, letters, or other basic designators. In some embodiments, the titles may be based on a prior title or heading, such as a chapter number or heading. For example, when a segment follows "Chapter 2," then the title module 218 may create a title of "Chapter 2.1" or another variation of "Chapter 2" to show a subdivision of the chapter (e.g., "Chapter 2, part I"). In various embodiments, the title module 218 may create a descriptive title for a segment, such as a textual description that describes content in the segment (e.g., "Chapter 2: Joan finds Peter"). For example, the title module 218 may analyze text in the segment to determine a repeated theme, a scene, an important character, an important object, or other content for use as title of the segment. The title module 218 may store the title in association with the segment and/or end point in the annotation data 214. The title may be used when rendering a menu and/or the segment in an annotated version of the media item, such as by the rending engine 222.

The graphics module 220 may determine a graphic, such as a reward, image, animation, or other graphic for rendering near or proximate to an end point. For example, the graphics module 220 may receive a selection of a graphic, a theme (e.g., collection of graphics), reward, or other graphic to present at or proximate to one or more of the end points determined for the media item. For example, a graphic may signify an achievement, such as finishing the segment via a graphic of a goal post, an animated fireworks display, animated confetti, text, and so forth. The graphic may provide information about a reward, such as to reward a child or student for completing the segment. For example, the reward may be a code that can be used to access other content on the user device, credits to obtain other content or items, and so forth.

FIGS. 3 and 5-7 are flow diagrams illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
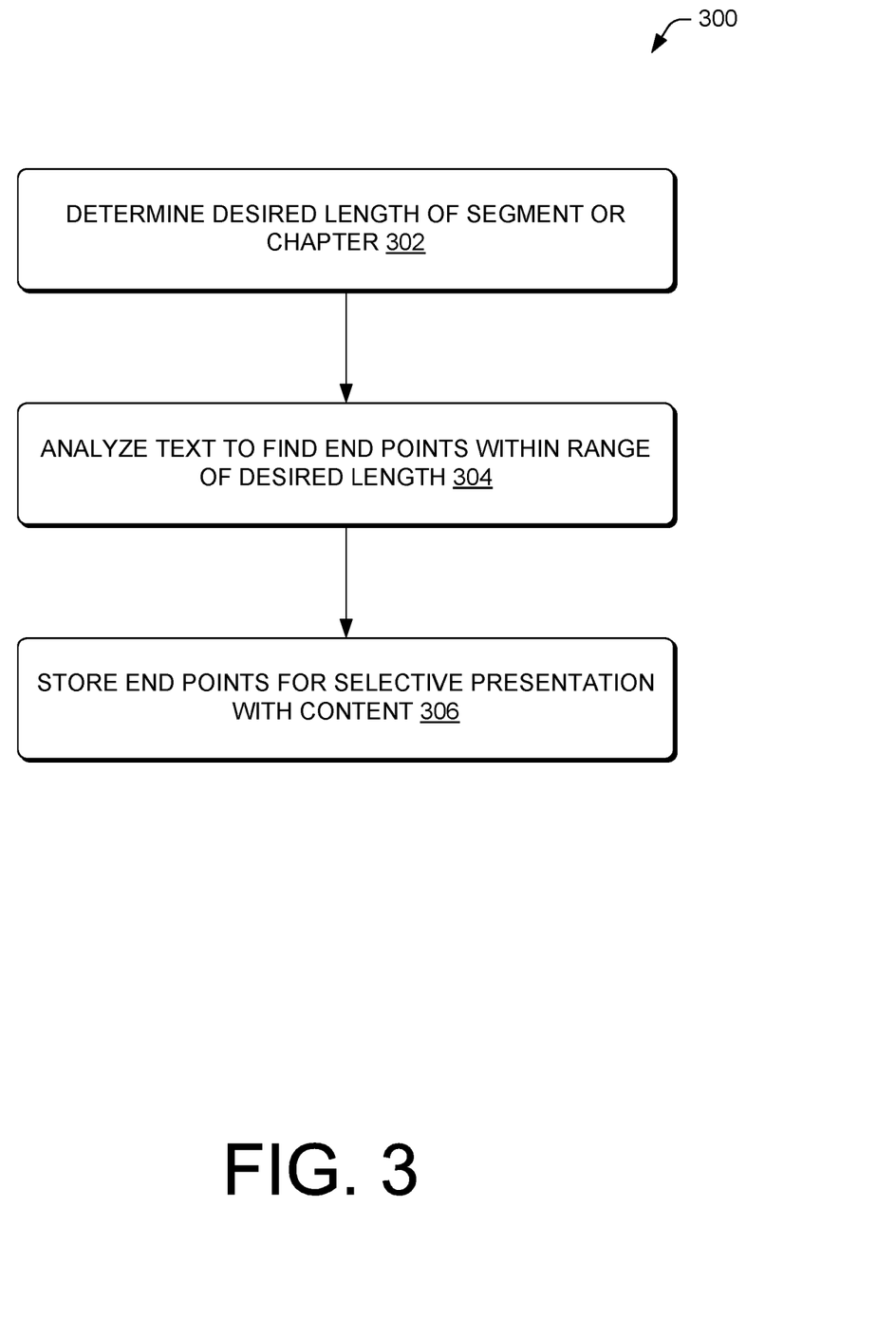
FIG. 3 is a flow diagram of an illustrative process to perform personalized segmentation of media content.

FIG. 3 is a flow diagram of an illustrative process 300 to perform personalized segmentation of media content. The process 300 is described with reference to the environment 100 and the computing architecture 200.

At 302, the UI module 116 may determine a user selection indicating a desired length of a segment or chapter for a session or for regular sessions. For example, the input may be used to create one segment in a media item or multiple segments (e.g., segment the entire media item from start to finish). The user input may be a time or time range, a number of words, a number of pages, and/or a reference item having desired segmentation (e.g., another book having a desirable chapter length, etc.). In some embodiments, the consumption rate module 118 may determine a consumption rate, such as a reading rate via the user profile data 210, to enable conversion of the desired length in reading or consumption rate to a number of words or other metric. The segmentation module 120 may determine a range of words (or other metric) to use when searching for candidate end points for a section. As an example, the desired length may be 20 minutes of reading time. The consumption rate may be 100 words per minute. Thus, the amount of words may be 2000 words (i.e., 20 minutes×100 words/minute=2000 words). The segmentation module 120 may create a range for the end points, which may be a fixed value, a percent, a user specified value, or another value. In this example, the range may be +10% and −0%, such as when the desired time is a minimum time. Thus, the range may be 2000-2200 words for an end point of the first segment. As an example, the segmentation module 120 may select an end point after the $2190^{th}$ word, which may be a logical break at the end of a paragraph, the end of a format, or at some other logical location. The segmentation module 120 may then search for the next endpoint based on the location of the last end point (at after the $2190^{th}$ word), and thus may use a range of 4190-4390 (i.e., 2190+2000=4190 and 4190+200=4390). However, in some embodiments, multiple consecutive ranges may be determined in advance, such as a first range of 2000-2200 words, a second range of 4000-4200, and so forth.

At 304, the segmentation module 120, via the end point module 216, may analyze text to find end points within a range of the desired length. The segmentation module 120 may use various techniques described herein to determine candidate end points within the desired range of words. The end points may be logical breaks in text, which may be identified by a format of the media item, by an analysis of grammar usage in the media item, analysis of content (or a narrative) included in the media file (e.g., analyzing the storyline for groupings of themes, etc.), information provided by the other users 112 via the other devices 110, information from the media sources 124, and/or other information. The segmentation module 120 may then select one or more end points from the candidate end points for use in segmenting the media item.

At 306, the segmentation module 120 may store the end points for selective presentation with media item. For example, the segmentation module 120 may store the end points as annotations in the annotation data 214. The media item may be presented with the segments or chapters when the rendering engine 222 uses the segments/chapters in the annotation data 214 or may be rendered in an original presentation when the rendering engine 222 refrains from using the segments/chapters in the annotation data 214.

The process 300 may be applied to audio, such as audiobooks, podcasts, or other audio works. For example, the operation 304 may search for end points in the audio using audio analysis techniques, which may be the same or similar as those described above with reference to the end point module 216, but may employ speech-to-text algorithms. The end point module 216 may use other techniques adapted for analysis of audio or imagery (e.g., video), such as detection of pauses, major changes in sound or imagery, and/or other techniques that indicate logical breaks in the media item.

In some embodiments, a playback rate of audio may be adjusted to enable having the audio play for an amount of time specified in the operation 302 by increasing or decreasing a pace or rate of playback of the audio. The rate of playback may be modified slightly causing only minor or nominal distorting of the audio or without otherwise creating a poor listening experience for a user. This change may be relatively small, but may be in the range of an increase or decrease a multiplier (e.g., between 1.0× and 1.05×).

Figure 4:
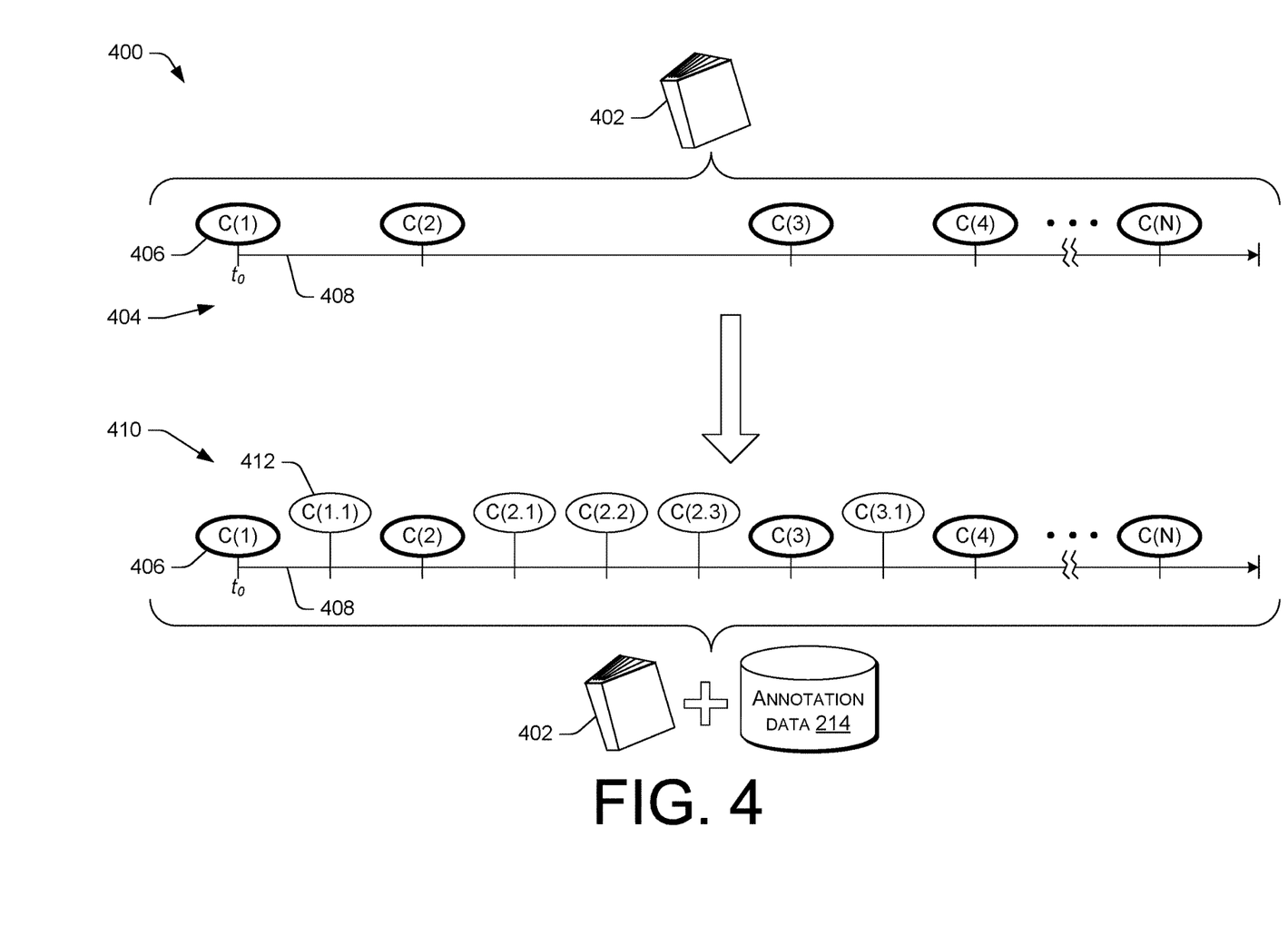
FIG. 4 is a schematic diagram showing illustrative segmentation using personalized chapters rendered in a media item.

FIG. 4 is a schematic diagram showing illustrative segmentation using personalized chapters 400 rendered in a media item. A media item 402 (e.g., an eBook or other media item), when plotted in an original form 404, may include chapters 406 designated as "C(1)" to "C(N)" along a duration graph 408, which designates where a chapter begins, thereby showing the duration between chapters. The duration graph 408 may represent consumption time. However the duration graph 408 may plot words, sentences, or other information associated with a duration of consumption. As shown in the duration graph 408, a duration between the first chapter "C(1)" and the second chapter "C(2)" is much shorter than a duration between the second chapter "C(2)" and the third chapter "C(3)." This may be undesirable to a reader, who may prefer shorter reading segments demarcated in an eBook or other media item.

The media item 402 may be segmented as discussed herein, such as by the process 300 described above. The segmentation may be implemented via annotations stored in the annotation data 214. The media item 402, when plotted in an annotated form 410 that includes use of the annotation data 214, may include additional segments 412, such as chapters or chapter segments, depicted as "C(1.1)," "C(2.1)," "C(2.2)," "C(2.3)," and "C(3.1)" along a duration graph 408. The segments 412 may have a same or similar duration, such a duration that is within a range specified by received user input via the UI module 116. Each segment may include other attributes, such as a title, a name, a graphic, and/or other information. In some embodiments, the original chapter references may be removed and replaced with segments determined using the techniques discussed herein. This may also be performed by using annotations and rendering the media file to apply the annotations while obscuring or otherwise refraining from rending the original chapter references.

Figure 5:
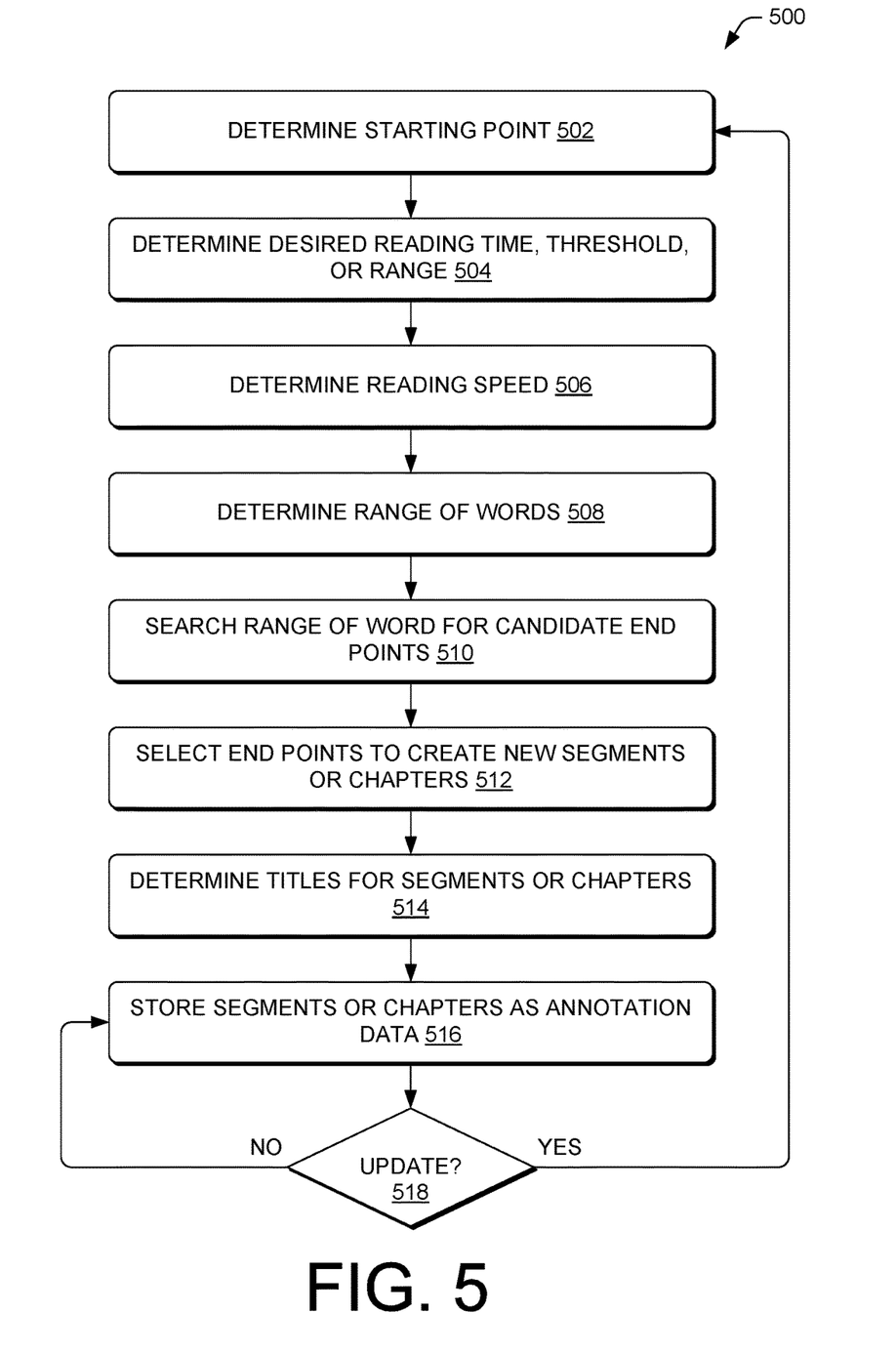
FIG. 5 is a flow diagram of another illustrative process to perform personalized segmentation of media content.

FIG. 5 is a flow diagram of another illustrative process 500 to perform personalized segmentation of media content. The process 500 is described with reference to the environment 100 and the computing architecture 200.

At 502, the segmentation module 120 may determine a starting point for segmentation of a media item. The starting point may be a start of a book or other media item, or another location. For example, when a book starts on page 8 due to presence of a table of contents and/or other information, then the segmentation module 120 may set the starting point at page 8 or the words on page 8. However, the starting point may be a location last visited or read by a user or a different location. For example, a user may request to segment a book starting at a specific point, possibly specified by a user input received by the UI module 116, such as the point where the user left off from a previous reading session.

At 504, the UI module 116 may determine a desired reading time, threshold, or range. The time may be a single time, which may be expanded or converted to a range as discussed above. The threshold may be a minimum time or a maximum time. In some embodiments, the desired reading time may be determined based on another media item such as a chapter length in another book.

At 506, the consumption rate module 118 may determine a consumption rate, such as a reading rate. The consumption rate module 118 may calculate the consumption rate and store calculated values in the user profile data 210 for later use. In some embodiments, the consumption rate module 118 may use an average rate, a weighted average rate, and/or may classify the rate based on information about the content (e.g., genre, author, title, etc.). The consumption rate module 118 may determine a rate to use to convert the desired length of reading or consumption to a number of words or other metric.

At 508, the segmentation module 120 may determine a range of words (or other metric such as sentences, paragraphs, pages, etc.) to use when searching for candidate end points for a section. As discussed above, the range of words may be determined by converting the desired reading time, threshold, and/or range to a number of words or other metric based at least in part on the consumption rate determined at the operation 506. In some embodiments, the segmentation module 120 may determine a range when the user input is a single time (e.g., input as a time or threshold). The range may be generated based on a percentage, a fixed value, a user input value, a crowdsourced value, or another value.

At 510, the end point module 216 may search the range of words or other metric for candidate end points. The end point module 216 may use any of the various techniques described herein to determine candidate end points within the desired range of words. The end points may be logical breaks in text, which may be identified by a format of the media item possibly determined by a document tree, grammar and punctuation usage, content analysis (e.g., analyzing the storyline for groupings of themes, etc.), information provided by the other users 112 via the other devices 110, information from the media sources 124, and/or other information. For example, within a range of words, multiple candidate end points may be determined. In some embodiments, the candidate end points may be associated with different ranges, and thus different segments, such as when a media item is segmented into multiple segments, each of the same or similar desired length, during the process 500.

At 512, the end point module 216 may select one or more of the candidate end points for use to segment the media item. The selection of the segments may be based on location of other candidate segments for a different segment, based on being closest to the desired reading length, and/or based on other factors.

At 514, the title module 218 may determine title for the segments. The title module 218 may create generic titles for segments, such as numbers, letters, or other basic designators. In some embodiments, the titles may be based on a prior title or heading, such as a chapter number or heading. In various embodiments, the title module 218 may create a descriptive title for a segment, such as a textual description that describes content in the segment. For example, the title module 218 may analyze text in the segment to determine a repeated theme, a scene, an important character, an important object, or other content for use as title of the segment. The title module 218 may store the title in association with the segment and/or end point in the annotation data 214.

At 516, the segmentation module 120 may store the end points, segments, titles, and/or other information generated in the process 500 for selective presentation with the media item. For example, the segmentation module 120 may store the end points, segments, and/or titles as annotations in the annotation data 214. The content may be presented with the segments or chapters when the rendering engine 222 uses the segments/chapters in the annotation data 214 or may be rendered in an original presentation when the rendering engine 222 refrains from using the segments/chapters in the annotation data 214.

At 520, the segmentation module 120 may update the segments or chapters and/or create a next segment or chapter, such as when each segment is created in a series based on an end point determined for a prior segment. As another example, the update may be performed when a user terminates consumption prior to finishing a segment, and desires to update the segments based on the new starting point (e.g., the termination point from the last session.). When the segmentation module 120 determines to perform an update (following the "yes" route from the decision operation 518), then the process 500 may advance to the operation 502 discussed above. When the segmentation module 120 determines not perform an update (following the "no" route from the decision operation 518), then the process 500 may advance to the operation 516 discussed above or may terminate.

Figure 6:
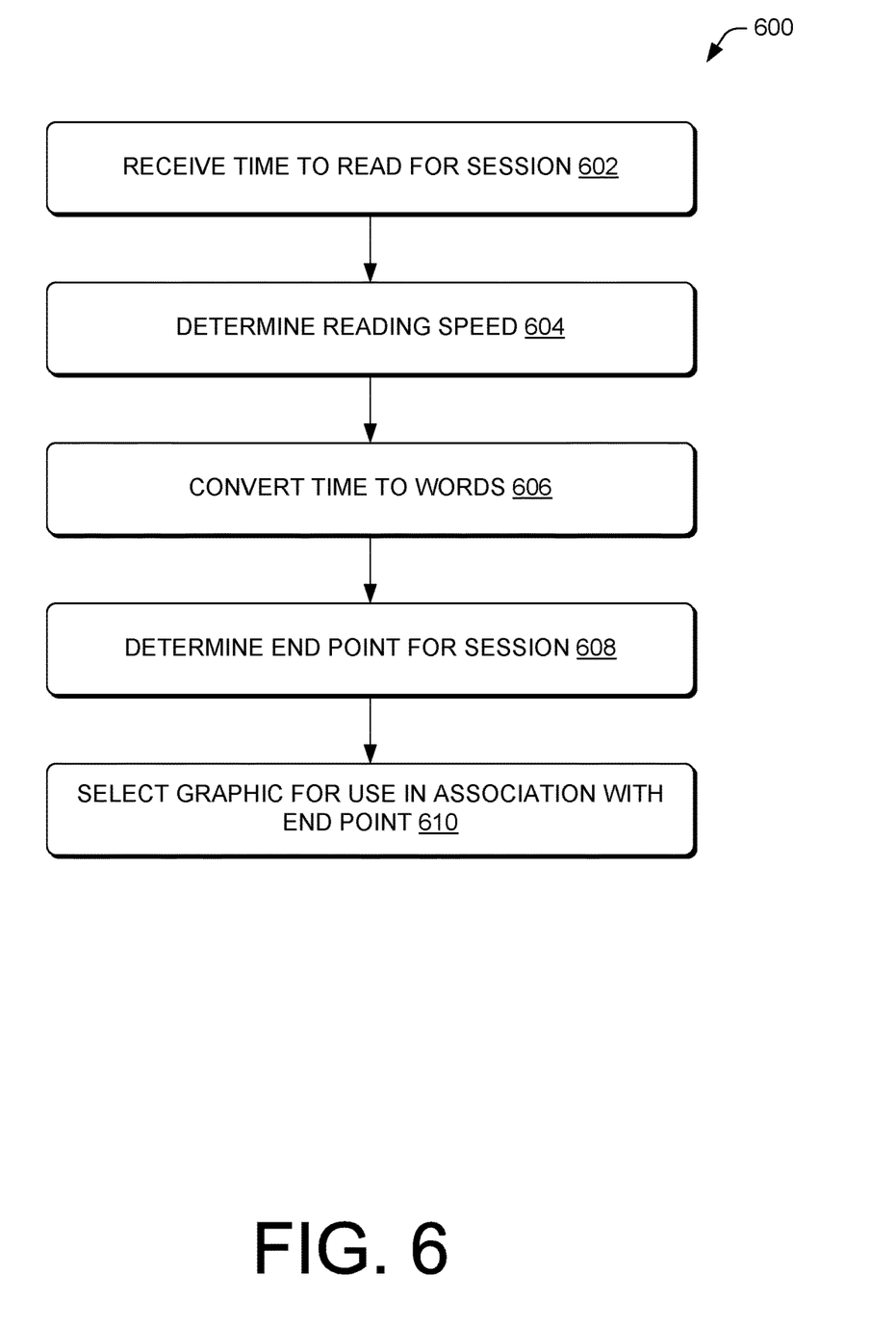
FIG. 6 is a flow diagram of an illustrative process to create an end point for a consumption session.

FIG. 6 is a flow diagram of an illustrative process 600 to create an end point for a session. The process 600 is described with reference to the environment 100 and the computing architecture 200. The process 600 may be used to create a single session or goal, such as for a one time session for a user, for a child, for a student, for a book club, and/or for other users.

At 602, the UI module 116 may determine a desired reading time, threshold, or range. The time may be a single time, which may be expanded or converted to a range as discussed above. The threshold may be a minimum time or a maximum time. In some embodiments, the desired reading time may be determined based on another media item such as a chapter length in another book.

At 604, the consumption rate module 118 may determine a reading rate. The consumption rate module 118 may calculate the reading rate for one or more users or may receive an inputted reading rate (possibly a default value or value for an average student, expected value, predetermined value, etc.). For example, when the process 600 is used for a book club, the consumption rate module 118 may determine an average reading rate for the users in the book club, possibly based on observed reading rates of prior sections of the book read by the book club. When the process 600 is used for a class of students, the consumption rate module 118 may receive a reading rate input by a teacher or administrator, for example.

At 606, the segmentation module 120 may determine a range of words (or other metric such as sentences, paragraphs, pages, etc.) to use when searching for end points for a section. As discussed above, the range of words may be determined by converting the desired reading time, threshold, and/or range to a number of words or other metric based at least in part on the reading speed determined at the operation 604.

At 608, the end point module 216 may search the range of words or other metric for end points. The end point module 216 may use any of the various techniques described herein to determine an end point within the desired range of words. The end point may be logical breaks in text, which may be identified by a format of the media item possibly determined by a document tree, grammar and punctuation usage, content analysis, information provided by the other users 112 via the other devices 110, information from the media sources 124, and/or other information.

At 610, the graphics module 220 may select a graphic for association with the end point determined at the operation 608. For example, when rendering an eBook, the graphic may be rendered after the end point, such as immediately following the end point or on a next page as the end point. The graphic may be an indicator of the end of the segment (e.g., a completion marker, etc.), a reward, an image, an animation, or other graphic for rendering near or proximate to an end point. For example, the graphics module 220 may receive a selection of a graphic, a theme (e.g., collection of graphics), a reward, or other graphic to present at or proximate to the end point determined for the media item. The graphic may signify an achievement, such as finishing the segment via a graphic of a goal post, an animated fireworks display, animated confetti, special text, and so forth. The graphic may provide information about a reward, such as to reward a child or student for completing the segment. For example, the reward may be a code that can be used to access other content on the user device, credits to obtain other content or items, and so forth.

Figure 7:
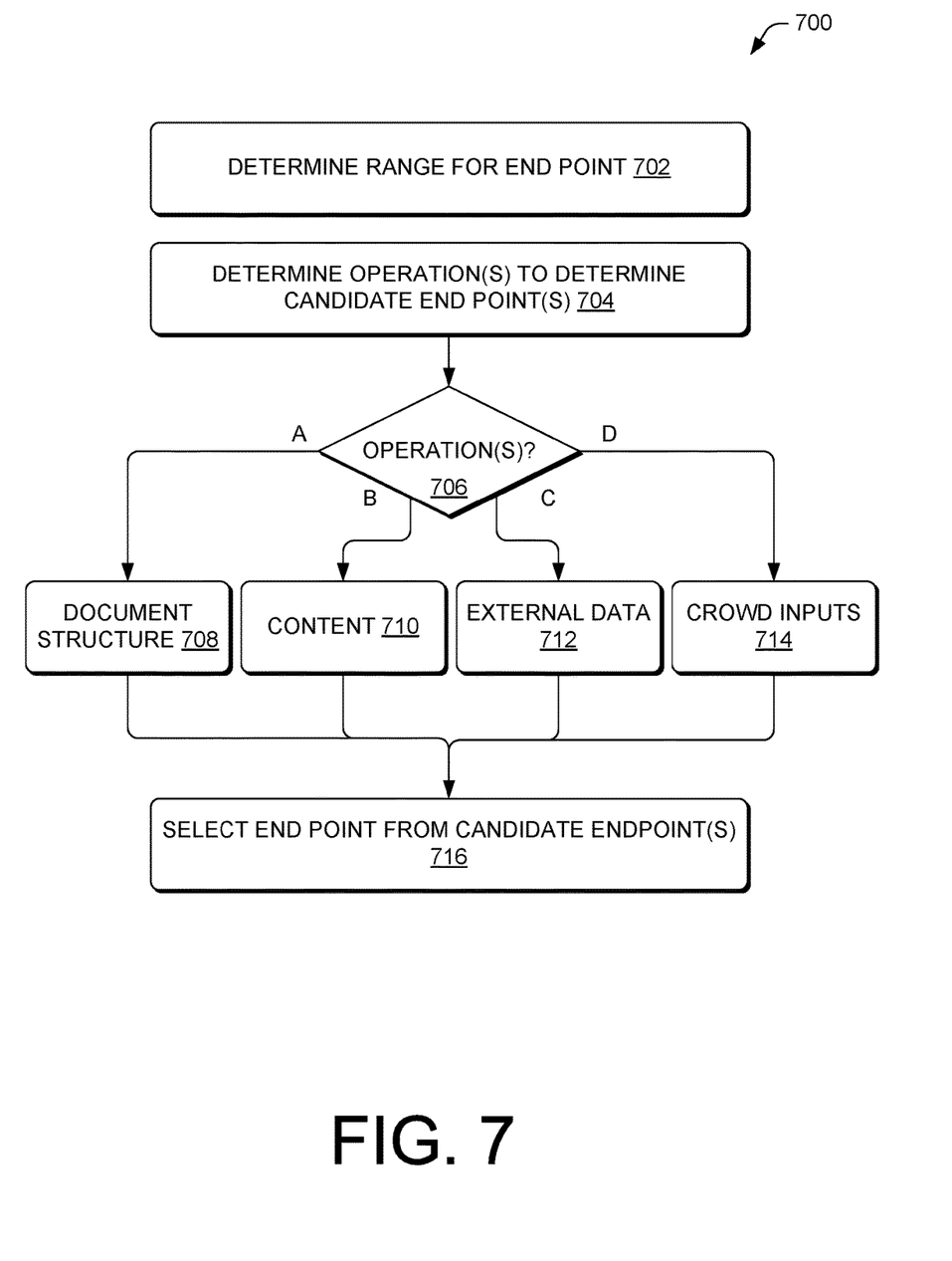
FIG. 7 is a flow diagram of an illustrative process to determine end points in a media item.

FIG. 7 is a flow diagram of an illustrative process 700 to determine end points in a media item. The process 700 is described with reference to the environment 100 and the computing architecture 200.

At 702, the segmentation module 120 may determine a range of words (or other metric such as sentences, paragraphs, pages, etc.) to use when searching for end points for a section. As discussed above, the range of words may be determined by converting the desired reading time, threshold, and/or range to a number of words or other metric based at least in part on the reading speed or the range of words may be determined in other ways. For example, the range of words may be determined based on user input or may be determined by a number of words in one or more chapters of another book.

At 704, the end point module 216 may determine one or more different operations used to identify end points within the range of words. The end point module 216 may use any of the various techniques described below (or multiple of the techniques) to determine an end point within the desired range of words. At a decision operation 706, one or more operations may be selected to determine the end points following at least one of the routes "A", "B", "C", or "D" as described below.

At 708, following the route "A" from the decision operation 706, the end point module 216 may analyze a document structure to determine end points. The document structure may include a format of a document and/or grammar/style of the content of the media item. The end point module 216 may create candidate end points by analyzing a format of the media item. The format may be provided by a document tree, such as from HTML expressions. As an example, an end of a table defined in HTML may be identified as a candidate end point. The end point module 216 may create candidate end points by analyzing grammar, such as paragraph usage, sentence usage, and other grammar usage. For example, the end point module 216 may create a candidate end point at the end of a sentence, paragraph, or page, rather than mid-sentence or possibly mid-paragraph.

At 710, following the route "B" from the decision operation 706, the end point module 216 may analyze content of the media item to determine end points. The end point module 216 may analyze specific word usage, themes, paragraphs, and/or other information in the underlying media content. For example, the end point module 216 may analyze text of a storyline for groupings of themes and create candidate end points at the end of such groupings. As another example, the end point module 216 may determine when characters enter or exit a scene, or when a scene changes, which may be determined as candidate end points.

At 712, following the route "C" from the decision operation 706, the end point module 216 may analyze data from other users to determine end points. The end point module 216 may create candidate end points by analyzing information provided by the other users 112 via the other devices 110. The information may be crowdsourced end point information, end points established by other user devices, edits to end points, commentary on end points, and other user-generated information related to end points. As an example, a location that one of the other users 112 terminates a reading session may be estimated based on consumption speed and time on a page. This termination point may be used as a candidate end point by the end point module 216.

At 714, following the route "D" from the decision operation 706, the end point module 216 may analyze data from other sources to determine end points. The end point module 216 may create candidate end points by analyzing information from the media sources 124. For example, an eBook may include an audiobook version. The end point module 216 may analyze the audiobook for long pauses by a presenter, which may be associated with text in the eBook and used as candidate end points, or vice versa.

At 716, following any of the operations 708-714, the end point module 216 may select one or more end points from the candidate end points for use in segmenting the media item. The selection of the segments may be based on location of other candidate segments for different segment, closest to the desired reading length, and/or based on other factors.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
memory storing computer-executable instructions that, when executed, cause the one or more processors to perform acts comprising:
determining a desired range of time of a reading session based at least in part on user input received from a user;
determining a reading rate associated with the user;
calculating a range of words to be included in the reading session based on the desired range of time and the reading rate;
determining one or more candidate endpoints located within a text-based document with the range of words, the one or more candidate endpoints being logical breaks usable to segment the text-based document;
selecting an endpoint from the one or more candidate endpoints to create a chapter segment, the chapter segment, when read by the user, being expected to be completed within the desired range of time;
inserting a graphic at a location associated with the endpoint, the graphic to indicate completion of the chapter segment; and
causing display of the text-based document and the graphic at a user device.

2. The system as recited in claim 1, wherein the one or more processors further perform acts comprising determining a title for the chapter segment based at least in part on an analysis of text included in the chapter segment.

3. The system as recited in claim 1, wherein the one or more processors further perform acts comprising storing the endpoint associated the chapter segment with annotation data that is separate from the text-based document, and further comprising modifying the text-based document based at least in part on the graphic.

4. The system as recited in claim 1, wherein the graphic is at least one of a completion marker, a reward, an image, or an animated graphic.

5. The system as recited in claim 1, wherein the determining one or more candidate endpoints includes at least one of:
receiving a candidate endpoint from crowd sourced information,
analyzing content to determine a logical break, or
analyzing a document tree used to format the text-based document to determine the logical break, or
analyzing at least one of a sentence structure or a paragraph structure to determine the logical break.

6. A method comprising:
determining a time allotted to consume a portion of a media item;
determining a consumption rate;
calculating a range of words to be included in the portion of a media item based at least in part on the desired time and the consumption rate;
determining an endpoint located within the media item with the range of words, the endpoint being a logical break to define a segment of the media item, wherein the endpoint separates a continuous body of content included in the media item;

associating the endpoint with the media item without modifying the media item; and causing presentation of the media item.

7. The method as recited in claim 6, further comprising associating a graphic with the endpoint, the graphic to be rendered adjacent to the endpoint when the media item is rendered with the endpoint.

8. The method as recited in claim 6, further comprising determining a title for the segment based at least in part on an analysis of text included in the segment.

9. The method as recited in claim 6, further comprising storing the endpoint associated the segment with annotation data that is separate from the media item, the annotation data configured to selectively modify an output of the media item.

10. The method as recited in claim 6, wherein determining the consumption rate includes analyzing consumption of a prior portion of the media item to determine the consumption rate associated with the media item.

11. The method as recited in claim 6, wherein the determining the endpoint further includes analyzing grammar usage in the media item to determine the endpoint.

12. The method as recited in claim 6, wherein the determining the endpoint further includes:

analyzing words included in the media item to determine at least one of a change in a theme, a change in a scene, or a change in presence of a character, and associating the endpoint with the at least one of the change in the theme, the change in the scene, or the change in the presence of the character.

13. The method as recited in claim 6, wherein the determining the endpoint further includes analyzing a document tree of the media item to determine the endpoint.

14. The method as recited in claim 6, wherein the determining the endpoint includes determining the endpoint from data received from another user device that accesses the media item.

15. A computing device comprising:

one or more processors; and memory storing computer-executable instructions that, when executed, cause the one or more processors to perform acts comprising:

determining a desired range of time to for a user to consume a portion of a document during a reading session;

determining a reading rate associated with the user;

calculating a range of words to be included in the reading session based at least in part on the desired range of time and the reading rate;

determining an endpoint located within the document with the range of words, the endpoint being a logical break to define a segment within the document, wherein the endpoint separates a continuous body of content included in the document;

storing the endpoint as annotation data that is associated with the document and rendering the document and the annotation data.

16. The computing device as recited in claim 15, wherein the one or more processors further perform acts comprising determining a title for the segment based at least in part on an analysis of text included in the segment.

17. The computing device as recited in claim 15, wherein the one or more processors further perform acts comprising sending at least a portion of the annotation data that includes at least the endpoint or the segment to another user device.

18. The computing device as recited in claim 15, wherein the one or more processors further perform acts comprising analyzing consumption of a prior portion of the document to determine the reading rate.

19. The computing device as recited in claim 15, wherein the one or more processors further perform acts comprising analyzing a document tree of the document to determine the endpoint.

20. The computing device as recited in claim 15 wherein the one or more processors further perform acts comprising analyzing grammar usage in the media item to determine the endpoint.

* * * * *